Aug. 21, 1956 | J. BROWN ET AL | 2,760,159

LOW-FREQUENCY PRECISION MODULATOR
FOR DRIFT COMPENSATION CIRCUIT
Filed May 28, 1952

INVENTORS
JOHN BROWN
CHARLES B. LESLIE

BY G. W. O'Brien
R. M. Hicks
ATTORNEYS

United States Patent Office 2,760,159

Patented Aug. 21, 1956

2,760,159

LOW-FREQUENCY PRECISION MODULATOR FOR DRIFT COMPENSATION CIRCUIT

John Brown, College Park, and Charles B. Leslie, Silver Spring, Md.

Application May 28, 1952, Serial No. 290,614

4 Claims. (Cl. 332—4)

Figure 1:
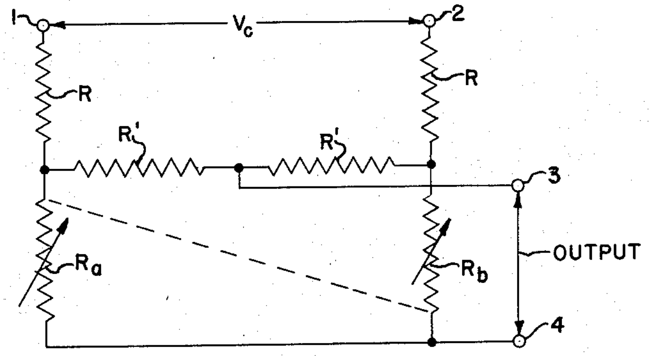

(Granted under Title 35, U. S. Code (1952), sec. 266)

The invention described herein may be manufactured and used by or for the Government of the United States of America for governmental purposes without the payment of any royalties thereon or therefor.

This invention relates to modulators and more particularly pertains to a modulator for use in connection with low frequency, carrier type, pickup units. Such pickup units may include the inductance type or the differential condenser type of pickup units, such as used in low frequency seismographs or in range recording systems wherein a series of instruments are used and the individual instruments must be corrected for drift of the pickup element.

The modulator of the present invention may be used as the centering voltage generator in the circuit for the low frequency vibration detector described in copending application, Serial No. 285,038, filed April 29, 1952, now Patent No. 2,699,973, by John V. Atanasoff and Ernest R. Kolsrud. In the aforesaid circuit the signal from the carrier type pickup is passed through a demodulator and an integrator wherein that portion of the signal due to drift, which signals have a frequency below the frequency of interest, is separated out and applied as the modulating voltage to the input terminals of the centering voltage generator. The output of the centering voltage generator is fed back degeneratively to the output circuit of the pickup thereby compensating for drift.

Drift may be introduced into the pickup units either electrically or mechanically due to changes in the components comprising the pickup unit or in the electrical circuits associated therewith. Drift may also be due to changes in the signal below the frequency of interest. The drift introduced into the pickup may be of extremely low frequency, for example of the order of 1 cycle per day. The modulator circuit of the instant invention provides a means for balancing out such drift and long term changes so that only the frequencies of interest will be recorded by the pickup unit. This is accomplished by the circuit of the instant invention which automatically provides a 180° out of phase carrier voltage which may be fed back to the pickup to canceal out signals produced by drift.

The method formerly used to balance out such drift in carrier type pickup units included a standard frequency converter tube which was used to control or modulate the carrier being fed back to the pickup unit, which voltage must be attenuated in a voltage divider because of the fact that the amplifier used in this arrangement has an extremely high gain. The combination of very large attenuation followed by high gain tends to produce unstable operation and introduces noise.

In the modulator of the instant invention the carrier voltage is modulated in a variable resistor voltage divider so that no gain is involved and the feed back signal required is a small fraction of the carrier voltage so that attenuation rather than gain is required. A modulator with the characteristics of the instant invention is necessary in compensating for drift in carrier type pickup units using a differential condenser principle where the movable diaphragm is of too great stiffness to position by electrical forces. It can also be used with carrier systems wherein the movable diaphragm is partially compensated for drift by mechanical means with superimposed electrical forces or it can be used as the only compensation in such delicately balanced systems.

In order to overcome the difficulties above indicated in balancing out the drift introduced into low frequency carrier type pickup units, it is an important object of this invention to provide means for automatically controlling or eliminating the effect of slow drift in the output voltage due to the electrical and mechanical components of low frequency carrier type pickups which operate down to zero frequency.

It is a further object of this invention to provide means for eliminating D.-C. drift, while permitting the recording of very low frequency signals, for example above .01 cycle per second.

It is a further object of this invention to provide a bridge type modulator circuit in which the balance at a carrier frequency is controlled by D.-C. current.

It is a further object of this invention to provide a bridge type modulator which depends on temperature change in the components of the bridge circuit for its operation.

It is a further object of this invention to provide a bridge circuit for a modulator depending on increases or decreases in current through thermally sensitive elements to provide a controlled carrier voltage of reversible phase.

Figure 2:
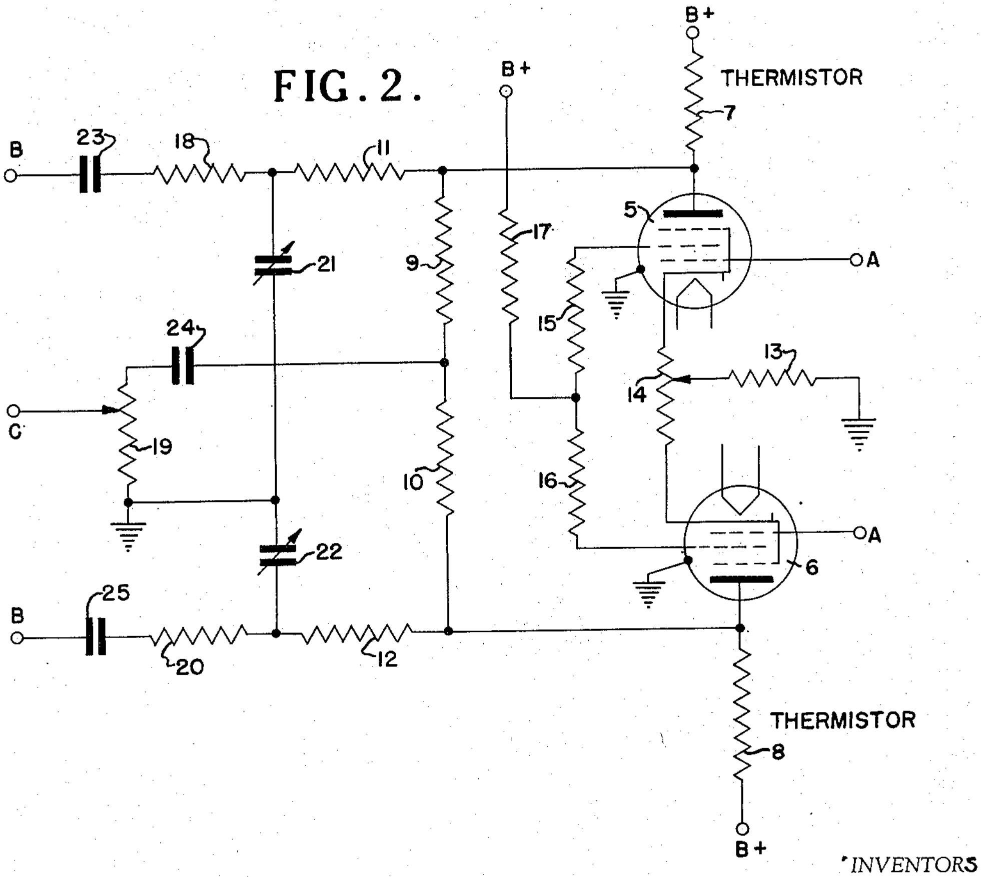

Other objects and many of the attendant advantages of this invention will be readily appreciated as the same becomes better understood by reference to the following detailed description when considered in connection with the accompanying drawings wherein:

Fig. 1 is an equivalent circuit diagram of the modulator of the instant invention; and Fig. 2 is a circuit diagram of a practical application of one form of the modulator of the instant invention.

A better understanding of the theory involved in the modulator of the instant invention may be had by referring to Fig. 1 wherein is represented an equivalent circuit of the modulator of the instant invention. This basic circuit involves a bridge type arrangement with input terminals 1 and 2 and output terminals 3 and 4. Push-pull constant amplitude carrier voltages, represented by $V_c$, are applied at terminals 1 and 2. These voltages are of the same frequency and phase as the carrier voltage which is applied to the carrier type pickup unit. In practical arrangements the carrier voltage impressed on terminals 1 and 2 must be taken from the same source that supplies the carrier to the pickup. The low freqeuncy modulating signals supplied to the modulator cause the variations in $R_a$ and $R_b$. $R_a$ and $R_b$ are resistors which can be varied inversely in value. When $R_a$ is equal to $R_b$ there is no output. When $R_a$ is greater than $R_b$ the output is of a particular phase and when $R_b$ is greater than $R_a$ the phase of the output is reversed. By varying $R_a$ and $R_b$ the output can be varied in amplitude smoothly from one phase through zero to the opposite phase. The carrier voltage is thus modulated in accordance with the inverse variations in $R_a$ and $R_b$. The variations in $R_a$ and $R_b$ to modulate the carrier are in effect similar to the application of a very low frequency push-pull signal. R, $R_a$ is one voltage divider and R, $R_b$ is another. The two R′ resistors provide means for obtaining the average of the voltage across $R_a$ and $R_b$. From the above description of the operation of the basic circuit it is therefor seen that the carrier voltage is modulated in a variable resistor voltage divider so that no gain is involved and the stability and noise of the amplifying converter tube as previously used is thereby eliminated. In applicant's novel circuit arrangement the feed back signal required of the modulator is a small fraction of the pickup carrier voltage, so that attenuation is required rather than gain which introduces instability.

The circuit shown in Fig. 2 is one form of a practical circuit employing the principles of operation of the basic circuit, Fig. 1. In this circuit resistors 7 and 8, which are thermistors, correspond to the variable resistors $R_a$ and $R_b$ in Fig. 1. Resistors 9 and 10 correspond to resistors indicated as R′ in Fig. 1 and resistors 11 and 12 correspond to resistors indicated as R in Fig. 1. The modulator consists of a pair of pentodes and their associated components. Pentodes 5 and 6 provide high impedance sources of the low frequency currents which control the A.–C. resistance of the thermistors 7 and 8. When a low frequency push-pull signal corresponding to drift in the pickup is fed in at the terminals A—A, a carrier voltage fed in at terminals B—B is modulated as the thermistors 7 and 8 vary in resistance due to current flow therethrough. The resulting output at terminal C is fed to an amplifier and mixed with the pickup signal to cancel out most of the drift signal. The push-pull signal applied to the terminals A—A is used to control the amount of current flowing through each of the tubes 5 and 6. Both screen grids are fed through the common resistor 17 and the two separate screen dropping resistors 15 and 16, which resistors provide some degeneration and decrease in gain. If the control grid of either tube goes positive, it tends to allow more current to flow through the tube. Screen current increases as well as the plate current and the increased screen current causes a larger drop in the resistor 15 or 16 and lowers the screen potential, thus counteracting part of the increased control grid voltage. This degeneration is desirable, for it increases the stability of the tube. Since the tubes 5 and 6 are operating in push-pull, the common screen resistor 17 does not cause degeneration, for when one screen increases its current the other decreases its current by an equal amount so that the sum of the two currents remains constant and thus the drop across this common resistor remains constant. A similar arrangement is used for the cathode resistance. The resistor 13 is used to provide a common bias which cannot introduce degeneration, because as the current from one tube increases the current from the other tube decreases. The potentiometer 14, however, gives a variable amount of degeneration since in this case the resistance is only in one cathode circuit. By making the degeneration variable between the two tubes, the current through both tubes can be made equal, even though the input grid voltage may not be exactly balanced or the tube characteristics may not be quite identical. As a push-pull signal, corresponding to the very low frequency portion of the output of the pickup, which it is desired to compensate, reaches the control grids, the current through one tube increases and decreases through the other. The plate currents pass through the thermistors 7 and 8, which are temperature-sensitive resistors. An increased current through the thermistor generates heat which causes the resistance of the element to decrease. When balanced the two thermistors 7 and 8 each normally have a resistance of approximately 4000 ohms. With a push-pull signal, the resistance of one thermistor increases while the other decreases. This variation in resistance of the thermistors is used to generate a signal to compensate for the drift of the pickup. A balanced push-pull carrier signal from an oscillator is fed in at the terminals BB. The resistors 11, 12, 18 and 20 and the thermistors 7 and 8 form voltage dividers between this carrier source of voltage and ground. The A.–C. voltages across the thermistors are equal and 180° out of phase. The two resistors 9 and 10 between the two plates form another voltage divider, so that half the voltage across these resistors appears at their junction and is fed through the potentiometer 19. When the two voltages are equal and opposite, there is a zero voltage at the output C. If, however, there is a voltage difference across the thermistors 7 and 8 half of the voltage differences across each thermistor appears at the junction of the resistors 9 and 10. Since the voltages are of opposite phase, one tends to cancel the other giving a resultant modulated carrier voltage. The carrier signal thus modulated has an amplitude and phase dependent upon the amount and direction of unbalance and is used to cancel out that portion of the output from the carrier type pickup which is due to drift. Capacitors 23, 24 and 25 offer a high impedance to the D.–C. in the plate circuits of the pentodes 5 and 6 and keep the D.–C. from affecting the carrier voltage and the output of the modulator. Variable condensers 21 and 22 are used to provide a fine adjustment for phase balancing.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A bridge circuit energized by push-pull constant amplitude alternating voltages applied to the input terminals thereof, variable resistance voltage divider means comprising a portion of said bridge circuit, said voltage divider means including relatively inversely variable resistances, means for simultaneously varying said resistances inversely relative to one another in response to a push-pull signal applied thereto, said inverse variations producing unbalance in the bridge thereby determining the phase and the amplitude of the output voltage.

2. A modulator comprising impedances arranged in a bridge circuit, electron tube means having high impedance output arranged in push-pull configuration, a low frequency push-pull modulating signal source connected to said electron tube means, means for applying a push-pull constant amplitude alternating voltage to said bridge circuit, variable resistance voltage divider means connected to said electron tube means, a D.–C. supply for said electron tube means, said low frequency signal controlling the conduction of said electron tube means to cause said direct current to flow through said variable resistance means thereby unbalancing said bridge circuit and resulting in modulation of said constant amplitude push-pull alternating voltage in phase and amplitude.

3. A device as in claim 2 wherein said variable resistance voltage divider means includes thermally sensitive impedances connected in the plate circuits of the electron tube means.

4. A modulator comprising impedances arranged in a bridge circuit, said impedances including thermally sensitive resistance elements, said bridge being energized by a push-pull constant amplitude alternating voltage, means actuated by an alternating voltage for unbalancing said bridge, said means including a first element and a second element connected to be driven by a push-pull voltage to cause simultaneous relatively inverse variations of the resistances in said thermally sensitive elements thereby producing an output which is the input push-pull constant amplitude alternating voltage modulated in phase and amplitude.

References Cited in the file of this patent

UNITED STATES PATENTS

| | | |
|---|---|---|
| 2,449,413 | Rich | Sept. 14, 1948 |
| 2,580,692 | Moe | Jan. 1, 1952 |

FOREIGN PATENTS

| | | |
|---|---|---|
| 246,195 | Great Britain | Jan. 4, 1926 |